(12) United States Patent
Horng et al.

(10) Patent No.: US 6,630,248 B1
(45) Date of Patent: Oct. 7, 2003

(54) SYNTHETIC ANTI-PARALLEL/PARALLEL/ PINNED LAYER SPIN VALVE

(75) Inventors: Cheng T. Horng, San Jose, CA (US); Min Li, Fremont, CA (US); Ru-Ying Tong, San Jose, CA (US); Simon H. Liao, Fremont, CA (US); Kochan Ju, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 240 days.

(21) Appl. No.: 09/764,231

(22) Filed: Jan. 19, 2001

(51) Int. Cl.⁷ .............. G11B 5/39; G11B 5/127
(52) U.S. Cl. ............ 428/611; 428/637; 428/663; 428/668; 428/669; 428/678; 428/216; 428/692; 360/324.11; 360/324.12
(58) Field of Search ............ 360/324, 324.1, 360/324.12; 428/611, 637, 663, 666, 668, 669, 678, 679, 680, 681, 682, 212, 213, 215, 216, 692

(56) References Cited

U.S. PATENT DOCUMENTS

| | | | |
|---|---|---|---|
| 5,702,832 A | 12/1997 | Iwasaki et al. | 428/611 |
| 5,738,946 A | 4/1998 | Iwasaki et al. | 428/611 |
| 5,780,176 A | 7/1998 | Iwasaki et al. | 428/692 |
| 5,936,810 A | 8/1999 | Nakamoto et al. | 360/113 |
| 6,115,224 A | 9/2000 | Saito | 360/324.1 |
| 6,122,150 A | 9/2000 | Gill | 360/324.11 |
| 6,141,191 A | * 10/2000 | Lee et al. | 360/324.1 |
| 6,146,776 A | * 11/2000 | Fukuzawa et al. | 428/692 |
| 6,226,159 B1 | * 5/2001 | Pinarbasi | 360/324.11 |
| 6,313,973 B1 | * 11/2001 | Fuke et al. | 360/324.1 |
| 2002/0167769 A1 | * 11/2002 | Saito et al. | 360/324.11 |

OTHER PUBLICATIONS

Tanaka, A., Shimizu, Y., Kishi, H., Nagaska, K, Kanai, H., and Oshiki, M., IEEE Trans. Mag., 35(2), 1999, 700–705.*
Moon, K., Kim, J., RO, J., Shong, E., Lee, S., and Young, K., IEEE Trans. Mag., 36(5), 2000, 2857–2859.*

* cited by examiner

*Primary Examiner*—Paul Thibodeau
*Assistant Examiner*—Kevin . Bernatz
(74) *Attorney, Agent, or Firm*—George O. Saile; Stephen B. Ackerman

(57) ABSTRACT

A spin valve structure is described that has greater pinned layer robustness than is found in spin valves of the existing known art, making it well suited for use in high density recording. This has been achieved by a using a modified pinned layer that is a laminate of five layers—a first layer of cobalt-iron, a layer of ruthenium, a second layer of cobalt-iron, a layer of nickel-chromium, and a third layer of cobalt-iron. The second layer of cobalt-iron should be about twice the thickness of the third cobalt-iron layer. The sum of the second and third cobalt-iron layer thicknesses may be greater or smaller than the thickness of the first cobalt-iron layer. A process for manufacturing the structure is also described.

24 Claims, 3 Drawing Sheets

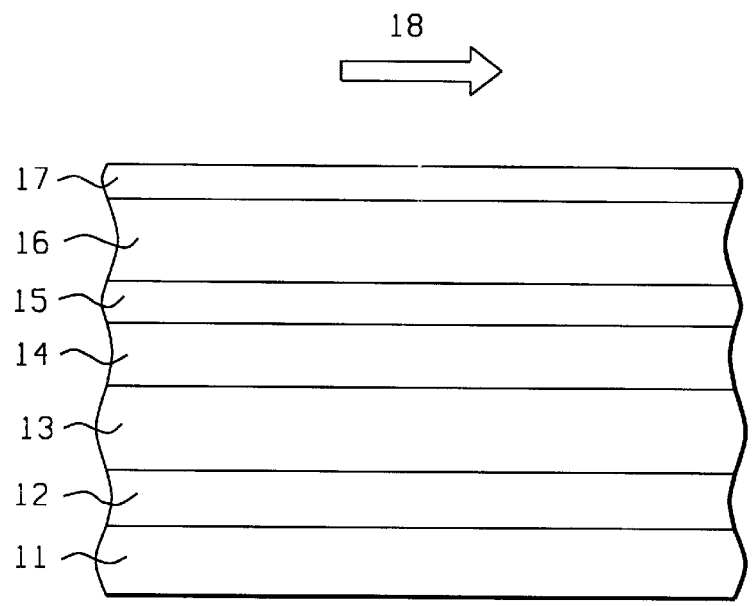
FIG. 1 - Prior Art
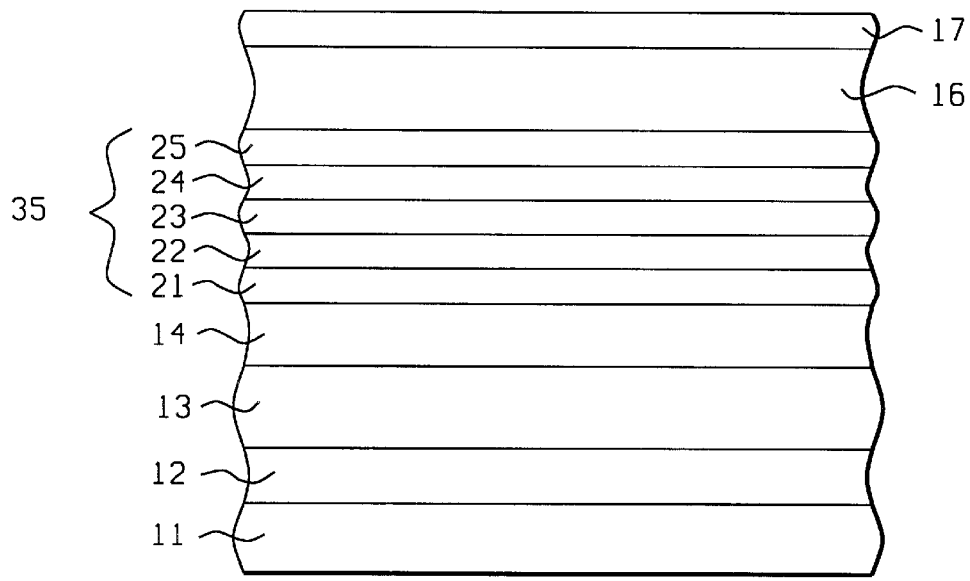
FIG. 2

SYNTHETIC ANTI-PARALLEL/PARALLEL/ PINNED LAYER SPIN VALVE

FIELD OF THE INVENTION

The invention relates to the general field of magnetic disk systems with particular reference to GMR based read heads and the stability of pinned layers therein.

BACKGROUND OF THE INVENTION

The principle governing the operation of magnetic read heads is the change of resistivity of certain materials in the presence of a magnetic field (magneto-resistance). In particular, most magnetic materials exhibit anisotropic behavior in that they have a preferred direction along which they are most easily magnetized (known as the easy axis). The magneto-resistance effect manifests itself as an increase in resistivity when the material is magnetized in a direction perpendicular to the easy axis, said increase being reduced to zero when magnetization is along the easy axis. Thus, any magnetic field that changes the direction of magnetization in a magneto-resistive material can be detected as a change in resistance.

The magneto-resistance effect can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are shown in FIG. 1. In addition to a seed layer 12 on a substrate 11 and a topmost cap layer 17, the key elements are two magnetic layers 13 and 15, separated by a non-magnetic layer 14. The thickness of layer 14 is chosen so that layers 13 and 15 are sufficiently far apart for exchange effects to be negligible (the layers do not influence each other's magnetic behavior at the atomic level) but are close enough to be within the mean free path of conduction electrons in the material.

If, now, layers 13 and 15 are magnetized in opposite directions and a current is passed though them along the direction of magnetization (such as direction 18 in the figure), half the electrons in each layer will be subject to increased scattering while half will be unaffected (to a first approximation). Furthermore, only the unaffected electrons will have mean free paths long enough for them to have a high probability of crossing over from 13 to 15 (or vice versa). However, once these electron 'switch sides', they are immediately subject to increased scattering, thereby becoming unlikely to return to their original side, the overall result being a significant increase in the resistance of the entire structure.

In order to make use of the GMR effect, the direction of magnetization of one the layers 13 and 15 is permanently fixed, or pinned. In FIG. 1 it is layer 15 that is pinned. Pinning is achieved by first magnetizing the layer (by depositing and/or annealing it in the presence of a magnetic field) and then permanently maintaining the magnetization by over coating with a layer of antiferromagnetic material, or AFM, (layer 16 in the figure). Layer 13, by contrast, is a "free layer" whose direction of magnetization can be readily changed by an external field (such as that associated with a bit at the surface of a magnetic disk).

The structure shown in FIG. 1 is referred to as a top spin valve because the pinned layer is at the top. It is also possible to form a 'bottom spin valve' structure where the pinned layer is deposited first (immediately after the seed and pinning layers). In that case the cap layer would, of course, be over the free layer.

As discussed above, the pinned layer (typically CoFe or similar ferromagnetic material) in the spin valve structures has to be exchange-biased by an AFM material. When pinned by MnPt or NiMn (AFM materials with high blocking temperature), the pinned layers usually display large anisotropy. The anisotropy field, Hck, is comparable to the pinning field Hpin, both these parameters being distributed over a range of values. These features result in pinned layer loop open and instability. This problem is more severe for the NiCr or NiFeCr seeded SVs in comparison to Ta seeded SVs.

It is also known that SVs made of a synthetic anti-parallel pinned layer (SyAP) can significantly reduce the loop open in the pinned layer. The pinning strength of a SyAP SV is much higher than that of the regular single SV. Typically, in the SyAP SV, AP1 and AP2 (two anti-parallel layers with AP2 being the layer close to the AFM) are coupled together through a layer of Ru and rotate coherently. This causes the Hck effect from AP2 to be greatly reduced. While this approach is a definite improvement on the state of the art, there are still loop opens in some cases (see later).

A routine search of the prior art was conducted. The following references of interest were found:

In U.S. Pat. No. 6,122,150, Gill shows a SV with two anti-parallel CoFe layers separated by a layer of Ru and capped with NIO. Iwasaki et al. in U.S. Pat. No. 5,738,946 show a SV MR with a NiCr protective film, while in U.S. Pat. No. 6,115,224, Saito discloses a SV MR process. Additionally, Iwasaki et al. (U.S. Pat. No. 5,702,832), Nakamoto et al. (U.S. Pat. No. 5,936,810), and Iwasaki et al. (U.S. Pat. No. 5,780,176) all show related MR processes and structures.

SUMMARY OF THE INVENTION

It has been an object of the present invention to provide a spin valve structure that has greater pinned layer robustness than is found in spin valves of the existing known art.

It has been an object of the present invention to provide a spin valve structure that exhibits a minimum amount of open looping in its hysteresis curve.

Another object of the invention has been to provide spin valve that is highly suitable for use in high density recording.

A further object of the invention has been to provide a process for the manufacture pf said spin valve and pinned layer.

These objects have been achieved by a using a modified pinned layer that is a laminate of five layers—a first layer of cobalt-iron, a layer of ruthenium, a second layer of cobalt-iron, a layer of nickel-chromium, and a third layer of cobalt-iron. The second layer of cobalt-iron should be about twice the thickness of the third cobalt-iron layer. The sum of the second and third cobalt-iron layer thicknesses may be greater or smaller than the thickness of the first cobalt-iron layer. A process for manufacturing the structure is also disclosed.

BRIEF DESCRIPTION OF THE DRAWINGS

FIG.1 is a cross-section of a spin valve structure formed according to the teachings of the prior art.

FIG. 2 is a cross-section of a spin valve structure formed according to the teachings of the present invention.

DESCRIPTION OF THE PREFERRED EMBODIMENTS

Figure 3A:
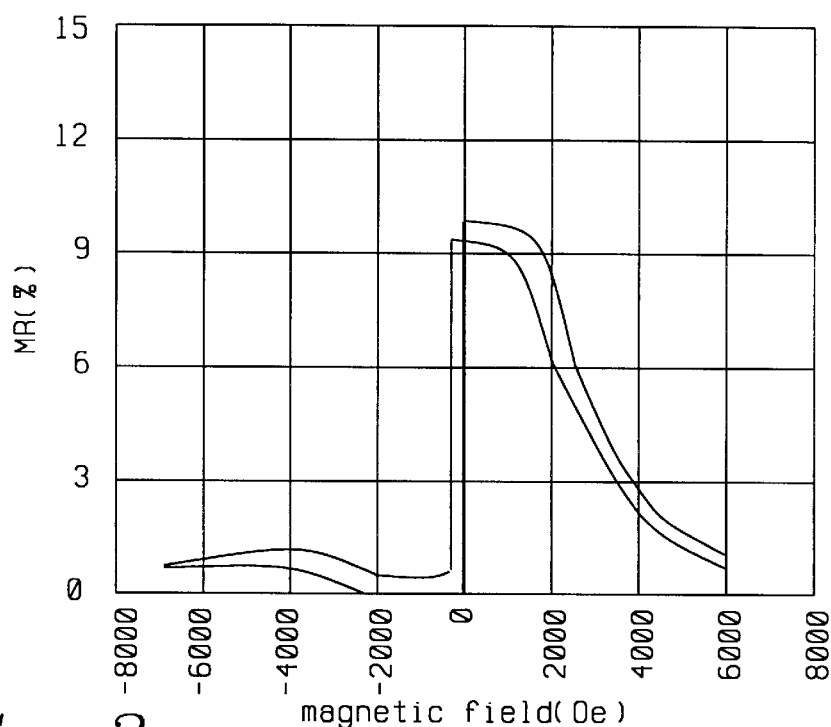
FIGS. 3a and 4a are R-H plots for SV structures made according to our earlier practices.

In a recent application by Horng et al (application Ser. No. 09/495,348, filed Feb. 1, 2000), it is shown that single SV having pinned layer laminated with a very thin (3–5 Å) NiCr layer greatly reduces the loop opening. The two laminated to the practices disclosed in the present invention.

pinned layers in the single SV were defined as P1 and P2, in which P2 is the layer closest to the AFM material. The coupling between P1 and P2 is ferromagnetic and the strength is in the order of 1 erg/cm². This structure was named a parallel-pinned (PP) structure. The reason that this structure can reduce loop opens is similar to SyAP structure. The coupling between P1 and P2 makes the rotation coherent and hence the Hck from P2 is reduced. However, the pinning field of the PP structure, as in the single spin valve, is not high enough for high-density recording heads.

The above two structures: SyAP and PP, show that separation of AP1 (or P1) from AP2 (or P2) by a nonmagnetic layer, either through antiferromagnetic coupling or ferromagnetic coupling, can greatly reduce the loop open (hysteresis). P1 takes advantage of both the increased pinning strength and the loop open reduction. In the present invention, we disclose a structure that combines the strong points of these two structures.
The new structure, which we call SyAPP, is:

Seed/free/Cu/AP1/Ru/AP2a/NiCr/AP2b/AFM/CAP

For comparison, SyAP is:

Seed/free/Cu/API/Ru/AP2/AFM/CAP and PP is:

Seed/free/Cu/P1/NiCr/P2/AFM/CAP

Referring now to FIG. 2, we show there a schematic cross-section of a top spin valve structure that embodies the present invention. A comparison with FIG. 1 of the prior art will reveal that the key novel feature of the invention is the replacement of the homogeneous pinned layer 15 with a multi-layer laminate 35 of 5 layers (layers 21–25).

We now provide a description of a process for manufacturing the spin valve of the present invention. It is important to note that, since the exchange forces that determine the behavior of structures such as spin valves operate over very short distances, the various thicknesses specified in the claims are critical, as opposed to optimal. A structure having the same sequence of layers, but one or more thicknesses outside the claimed ranges, will likely have quite different characteristics from the structures disclosed by the present invention.

The process begins with the provision of suitable substrate 11 (as seen in FIG. 2). Examples of suitable substrate materials include aluminum oxide and silicon oxide. Next, seed layer 12 of NiCr is deposited onto substrate 11. This magneto-resistance enhancing layer has a thickness between about 45 and 60 Angstroms and a composition of between about 55 and 65 atomic % nickel and between about 35 and 45 atomic % chromium. Layer 12, as well as all subsequent layers, was deposited by means of DC-magnetron sputtering. The use of this material (instead of, for example, tantalum) is essential if the structure is to exhibit specular reflection at the interfaces.

The next layer to be laid down is free layer 13. This is depicted in FIG. 2 as a single layer but, in actuality, it is made up of a layer of nickel-iron, between about 20 and 60 Angstroms thick, and a composition of between about 77 and 83 atomic % nickel and between about 17 and 23 atomic % iron, in contact with layer 12, followed by a layer of cobalt-iron which is between about 5 and 15 Angstroms thick and having a composition of between about 85 and 95 atomic % cobalt.

Non-magnetic layer 14, typically copper between about 16 and 25 Angstroms thick, is then deposited over free layer 13. Then follows a choice of two sub-processes:

1$^{st}$ Sub-process (AP1 is Thicker than Ap2)

On the non-magnetic layer 14 is deposited layer 21 of CoFe between about 20 and 30 Angstroms thick with 25 Angstroms being preferred. This corresponds to AP1. This is followed by ruthenium layer 22, between about 6.5 and 8.5 Angstroms thick with 7.5 Angstroms being preferred. Layer 23 corresponds to AP2a and is CoFe deposited onto ruthenium layer 22 to a thickness between about 10 and 15 Angstroms, with 14 Angstroms being preferred. On layer 23 is deposited NiCr laminating layer 24 which has a thickness of between about 3 and 7 Angstroms, with 5 Angstroms being preferred. Finally (for the 1$^{st}$ sub-process) layer 25 is deposited onto laminating layer 24. Layer 25 corresponds to AP2b and is CoFe with a thickness between about 5 and 8 Angstroms, with 7 Angstroms being preferred. Note that AP2a is about twice as thick as AP2b.

2$^{nd}$ Sub-process (AP2 is Thicker than API)

On the non-magnetic layer 14 is deposited layer 21 of CoFe between about 15 and 23 Angstroms thick with 19 Angstroms being preferred. This corresponds to AP1. This is followed by ruthenium layer 22, between about 6.5 and 8.5 Angstroms thick with 7.5 Angstroms being preferred. Layer 23 corresponds to AP2a and is CoFe deposited onto ruthenium layer 22 to a thickness between about 12 and 16 Angstroms, with 14 Angstroms being preferred. On layer 23 is deposited NiCr laminating layer 24 which has a thickness of between about 3 and 7 Angstroms, with 5 Angstroms being preferred. Finally (for the 2$^{nd}$ sub-process) layer 25 is deposited onto laminating layer 24. Layer 25 corresponds to AP2b and is CoFe with a thickness between about 6 and 10 Angstroms, with 7 Angstroms being preferred. Note that AP2a is also about twice as thick as AP2b here.

At the conclusion of either sub-process, the main process also concludes with the deposition of MnPt layer 16 onto layer 25, to a thickness between about 70 and 250 Angstroms, with 200 Angstroms being preferred, followed with the deposition of NiCr capping layer 17 to a thickness between about 30 and 50 Angstroms, with 50 Angstroms being preferred.

Experiments Done to Confirm Performance of Invention

The following SV structures (pinned layer underlined) were made.

1. Ap1 > Ap2 case:   AP1   AP2

SyAP: NiCr55/NiFe65/CoFe10/Cu20/CoFe25/Ru/CoFe20/MnPt200/NiCr50

AP1   AP2a   AP2b

SyAPP: NiCr55/NiFe65/CoFe10/Cu20/CoFe25/Ru/CoFe14/NiCr5/COFe7/MnPt200/NiCr50

2. AP1<AP2 case:

SYAP:NiCr55/Cu10/NiFe30/NiCr5/NiFe30/CoFe3/Cu21/CoFe19/Ru7.5/CoFe21/MnPt200/NiCr50

SYAPP: NiCr55/Cu10/NiFe30/NiCr5/NiFe30/CoFe3/Cu21/CoFe19/Ru7.5/CoFe14/NiCr3/CoFe7/MnPt200/NiCr50

It is noted AP2a is about twice as thick as AP2b.

Figure 3B:
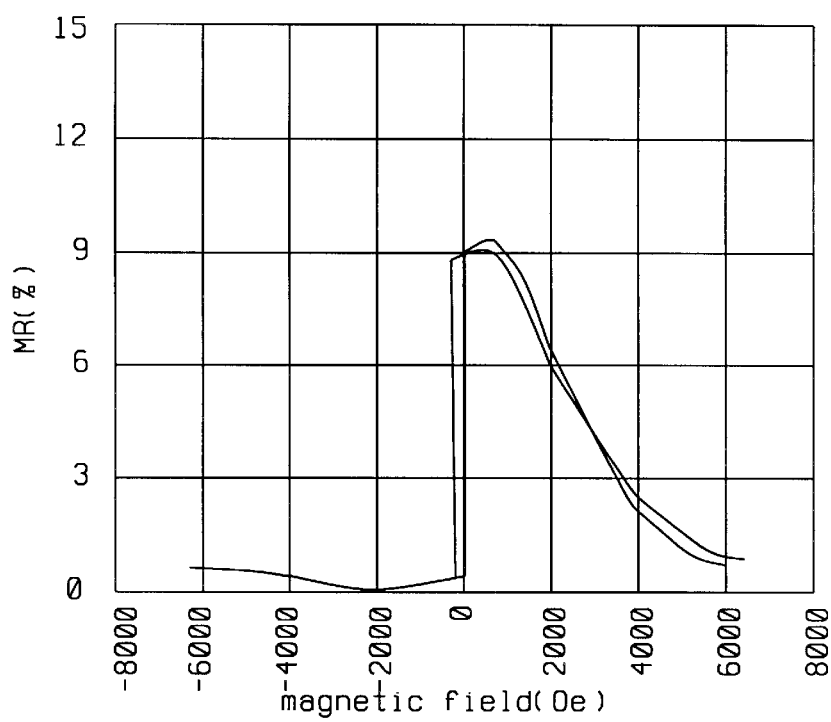
FIGS. 3b and 4b are R-H plots for SV structures made according
Figure 4A:
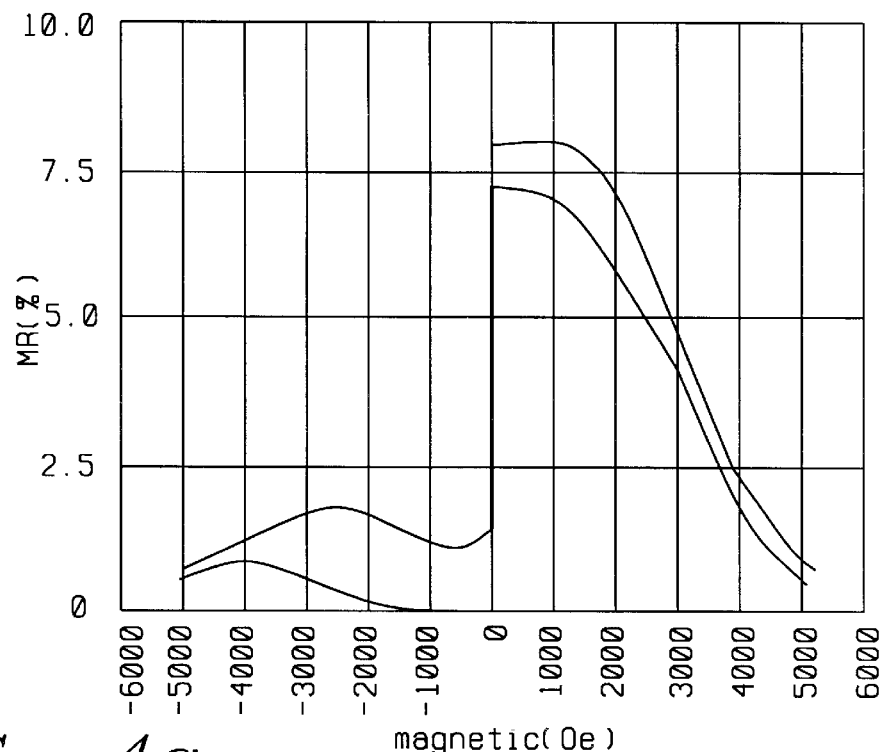
Figure 4B:
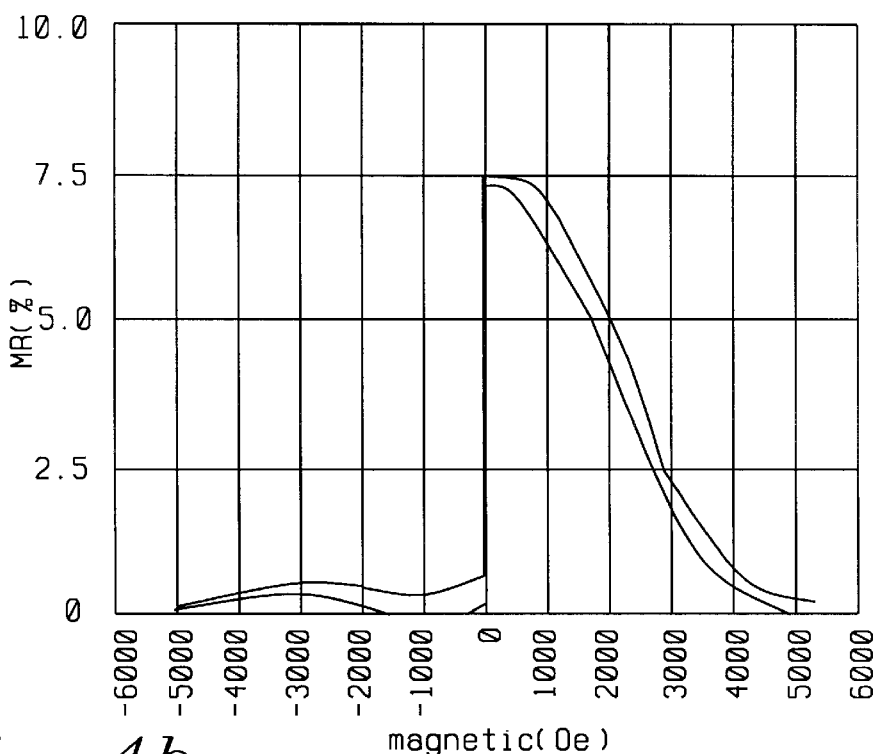

FIGS. 3b and 4b show the experimental R-H curves for top SVs with AP1>AP2 and AP1<AP2 cases, respectively. For comparison, R-H curves for the "normal" SYAP were also measured and are shown in FIGS. 3a and 4a. From these figures it can be seen that the loop open was clearly reduced for the SyAPP SV. The AP1<AP2 case shows more drastic effects of loop open reduction. This result is in good agreement with the coherent rotation model simulation results.

The above results demonstrate that SVs made of synthetic anti-parallel parallel-pinned layers yield much better pinned layer robustness. This improved pinned layer robustness will make the SyAPP spin valve most suitable for high density recording.

We note here that this type of SyAPP layer can also be applied to a bottom SV structure.

Finally, comparison with the SyAP SV showed that the GMR of the SyAPP SV did not degrade much.

While the invention has been particularly shown and described with reference to the preferred embodiments thereof, it will be understood by those skilled in the art that various changes in form and details may be made without departing from the spirit and scope of the invention.

What is claimed is:

1. A process for forming a pinning layer within a spin valve, comprising:

on a non-magnetic layer, depositing a first layer of cobalt-iron between 20 and 30 Angstroms thick;

depositing on the first layer of cobalt-iron a ruthenium layer between 6.5 and 8.5 Angstroms thick;

on the ruthenium layer, depositing a second cobalt-iron layer to a thickness between 10 and 15 Angstroms;

on the second cobalt-iron layer depositing a NiCr laminating layer to a thickness of between 3 and 7 Angstroms; and on the NiCr laminating layer, depositing a third layer of cobalt-iron to a thickness between 5 and 8 Angstroms.

2. The process described in claim 1 wherein said layers of cobalt-iron contain between 85 and 95 atomic % cobalt.

3. A process for manufacturing a spin valve structure, comprising the sequential steps of:

providing a substrate and depositing thereon a NiCr seed layer;

on said seed layer, depositing a free layer of nickel-iron followed by a first layer of cobalt-iron and then depositing a layer of non-magnetic material on the free layer;

on the non-magnetic layer depositing a second layer of cobalt-iron between 20 and 30 Angstroms thick;

depositing on the second layer of cobalt-iron a ruthenium layer between 6.5 and 8.5 Angstroms thick;

on the ruthenium layer, depositing a third cobalt-iron layer to a thickness between 10 and 15 Angstroms;

on the third cobalt-iron depositing a NiCr laminating layer to a thickness of between 3 and 7 Angstroms;

on the NiCr laminating layer, depositing a fourth layer of cobalt-iron to a thickness between 5 and 8 Angstroms, which is one half the thickness of the third cobalt-iron layer and which, when added to the thickness of said third cobalt-iron layer, is less than the thickness of the second cobalt-iron layer; and on the fourth cobalt-iron layer, depositing a layer of manganese platinum followed by the deposition on the manganese platinum layer of a capping layer.

4. The process described in claim 3 wherein said layers of cobalt-iron contain between 85 and 95 atomic % cobalt.

5. The process described in claim 3 wherein said layers of NiCr contain between 55 and 65 atomic % nickel.

6. The process described in claim 3 wherein said manganese platinum layer is deposited to a thickness between 70 and 250 Angstroms.

7. The process described in claim 3 wherein said manganese platinum layer contain between 50 and 60 atomic % manganese.

8. A process for manufacturing a spin valve structure, comprising the sequential steps of:

providing a substrate and depositing thereon a NiCr seed layer;

on said seed layer, depositing a free layer of nickel-iron followed by a first layer of cobalt-iron and then depositing a layer of non-magnetic material on the free layer;

on the non-magnetic layer depositing a second layer of cobalt-iron between 15 and 22 Angstroms thick;

depositing, on the second layer of cobalt-iron, a ruthenium layer between 6.5 and 8.5 Angstroms thick;

on the ruthenium layer, depositing a third cobalt-iron layer to a thickness between 12 and 16 Angstroms;

on the third cobalt-iron depositing a NiCr laminating layer to a thickness of between 3 and 7 Angstroms;

on the NiCr laminating layer, depositing a fourth layer of cobalt-iron to a thickness between 6 and 10 Angstroms, which is one half the thickness of the third cobalt-iron layer and which, when added to the thickness of said third cobalt-iron layer, is greater than the thickness of the second cobalt-iron layer; and on the fourth cobalt-iron layer, depositing a layer of manganese platinum followed by the deposition on the manganese platinum layer of a capping layer.

9. The process described in claim 8 wherein said layers of cobalt-iron contain between 85 and 95 atomic % cobalt.

10. The process described in claim 8 wherein said layers of NiCr contain between 55 and 65 atomic % nickel.

11. The process described in claim 8 wherein said manganese platinum layer is deposited to a thickness between 70 and 250 Angstroms.

12. The process described in claim 8 wherein said manganese platinum layer contains between 50 and 60 atomic % manganese.

13. A pinning layer, for use in a spin valve, consisting of:

a first layer cobalt-iron between 15 and 22 Angstroms thick;

on the first layer cobalt-iron a ruthenium layer between 6.5 and 8.5 Angstroms thick;

on the ruthenium layer, a second cobalt-iron layer having a thickness between 12 and 16 Angstroms;

on the second cobalt-iron layer, a NiCr laminating layer having a thickness between 3 and 7 Angstroms; and on the NiCr laminating layer, a third layer of cobalt-iron having a thickness between 6 and 10 Angstroms, which is one half the thickness of the second cobalt-iron layer.

14. The pinning layer described in claim 13 wherein said layers of cobalt-iron contains between 85 and 95 atomic % cobalt.

15. A spin valve structure, comprising:

a NiCr seed layer on a substrate;

on said seed layer, a free layer consisting of a laminate of a first layer of cobalt-iron on a layer of nickel-iron;

on the free layer a non-magnetic layer;

on the non-magnetic layer, a second layer of cobalt-iron between 20 and 30 Angstroms thick;

on the second layer of cobalt-iron, a ruthenium layer between 6.5 and 8.5 Angstroms thick;

on the ruthenium layer, a third cobalt-iron layer having a thickness between 10 and 15 Angstroms;

on the third cobalt-iron layer, a NiCr laminating layer having a thickness of between 3 and 7 Angstroms;

on the NiCr laminating layer, a fourth layer of cobalt-iron having a thickness between 5 and 8 Angstroms, which is one half the thickness of the third cobalt-iron layer and which, when added to the thickness of said third cobalt-iron layer, is less than the thickness of the second cobalt-iron layer; and on the fourth cobalt-iron layer, a layer of manganese platinum on which is a NiCr capping layer.

16. The spin valve described in claim 15 wherein said layers of cobalt-iron contain between 85 and 95 atomic % cobalt.

17. The spin valve described in claim 15 wherein said layers of NiCr contain between 55 and 65 atomic % nickel.

18. The spin valve described in claim 15 wherein said manganese platinum layer has a thickness between 100 and 250 Angstroms.

19. The spin valve described in claim 15 wherein said manganese platinum layer contains between 50 and 60 atomic % manganese.

20. A spin valve structure, comprising:

a NiCr seed layer on a substrate;

on said seed layer, a free layer consisting of a laminate of a first layer of cobalt-iron on a layer of nickel-iron;

on the free layer a non-magnetic layer;

on the non-magnetic layer, a second layer of cobalt-iron between 15 and 22 Angstroms thick;

on the second layer cobalt-iron a ruthenium layer between 6.5 and 8.5 Angstroms thick;

on the ruthenium layer, a third cobalt-iron layer having a thickness between 12 and 16 Angstroms;

on the third cobalt-iron layer, a NiCr laminating layer having a thickness of between 3 and 7 Angstroms;

on the NiCr laminating layer, a fourth layer of cobalt-iron having a thickness between 6 and 10 Angstroms, which is one half the thickness of the third cobalt-iron layer and which, when added to the thickness of said third cobalt-iron layer, is greater than the thickness of the second cobalt-iron layer; and on the fourth cobalt-iron layer, a layer of manganese platinum on which is a capping layer.

21. The spin valve described in claim 20 wherein said layers of cobalt-iron contain between 85 and 95 atomic % cobalt.

22. The spin valve described in claim 20 wherein said layers of NiCr contain between 55 and 65 atomic % nickel.

23. The spin valve described in claim 20 wherein said manganese platinum layer has a thickness between 70 and 250 Angstroms.

24. The spin valve described in claim 20 wherein said manganese platinum layer contains between 50 and 60 atomic % manganese.

* * * * *